United States Patent [19]

Freer

[11] Patent Number: 4,864,432

[45] Date of Patent: Sep. 5, 1989

[54] SIGNAL MONITORING SYSTEM WITH FAILSAFE BACK-UP CAPABILITY

[75] Inventor: Raymond F. Freer, Fairfield, Conn.

[73] Assignee: Dictaphone Corporation, Stratford, Conn.

[21] Appl. No.: 97,908

[22] Filed: Sep. 17, 1987

[51] Int. Cl.$^4$ .................... G11B 5/02; G11B 27/36; G11B 15/12

[52] U.S. Cl. .................... 360/27; 360/31; 360/53; 360/63; 369/47

[58] Field of Search .................... 360/6, 27, 47, 53, 61, 360/63, 31; 369/47

[56] References Cited

U.S. PATENT DOCUMENTS

| | | | |
|---|---|---|---|
| 3,643,243 | 2/1972 | Johnson et al. | 360/63 |
| 3,869,707 | 8/1975 | Cupp | 360/6 |
| 4,011,586 | 3/1977 | Pastor et al. | 360/31 |
| 4,203,137 | 5/1980 | Beck et al. | 360/53 |

*Primary Examiner*—Alan Faber
*Assistant Examiner*—Surinder Sachar
*Attorney, Agent, or Firm*—Robert H. Whisker; Melvin J. Scolnick; David E. Pitchenik

[57] ABSTRACT

A multichannel communications recorder with capability to display channel activity, failsafe back-up, and a unique identification code; and apparatus for securing access to the recorder. The recorder is formed from modular elements configurable into a large number of selectable configurations. One or more record decks are controlled by a control module which includes a system control microprocessor and a CRT control microprocessor. Control is provided by selecting functions defined in accordance with a displayed page or moving to another page using softkeys. Access to various pages is controlled by various passwords. Because of the need to provide physical security for recorded tapes, each tape deck is secured by an electro-mechanical lock, which operates under system control. The system is provided with the capability to be configured in configuration providing back-up for selected channels. The system controller transfers the recording function from a primary to a back-up record deck in response to an error condition. Also, in the event of a failure of the system controller, a local controller may initiate transfer to a back-up record deck using a hardwired connection. The CRT can display the status of each channel monitored. The recorder also records a time code and a unique machine identification number on each tape. The machine number may be changed by one-time password obtained from the system manufacturer.

27 Claims, 15 Drawing Sheets

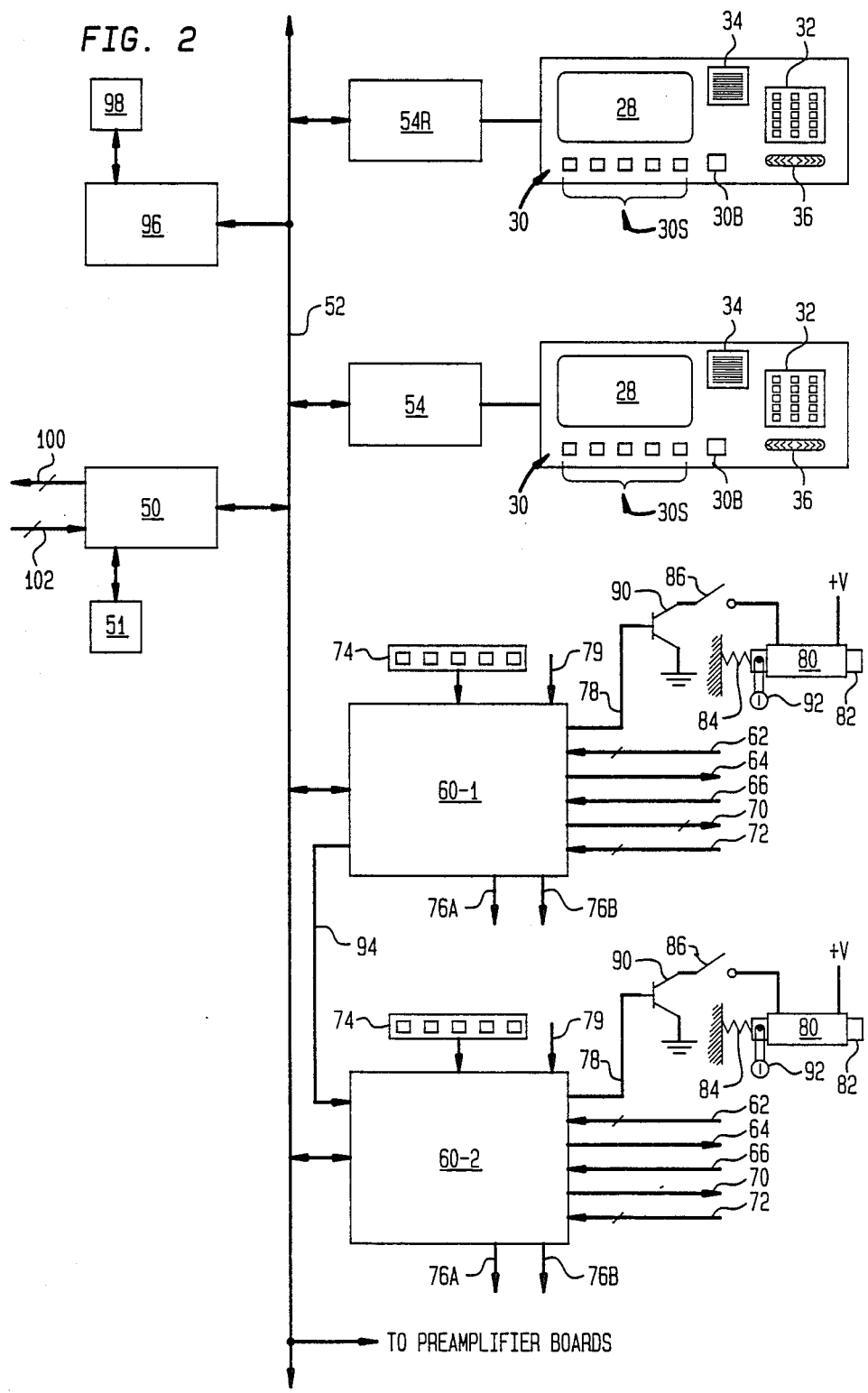

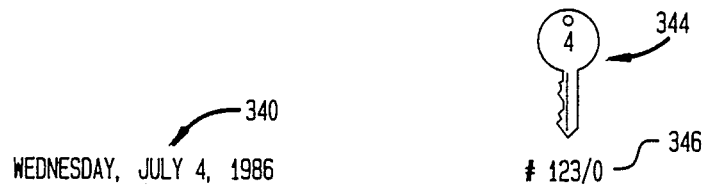

SIGNAL MONITORING SYSTEM WITH FAILSAFE BACK-UP CAPABILITY

RELATED APPLICATIONS

The present application is one of a group of commonly assigned, co-pending applications, listed below, all filed on an even date herewith and relating to a communication recorder marketed by the Assignee of the present application.

U.S. Application Ser. No. 097,901, for: UNIVERSAL INPUT COUPLING APPARATUS.

U.S. Application Ser. No. 097,904, for: METHOD AND APPARATUS FOR SCANNING AND RECOVERING INFORMATION FROM A RECORD MEDIUM.

U.S. Application Ser. No. 097,905, for: COMMUNICATIONS MONITOR AND LOGGER.

U.S. Application Ser. No. 097,909 for: MULTICHANNEL COMMUNICATIONS RECORDER HAVING THE CAPABILITY TO DISPLAY CHANNEL ACTIVITY AND STATUS.

U.S. Application Ser. No. 097,908 for: COMMUNICATIONS RECORDER WITH FAILSAFE BACK-UP CAPABILITY.

U.S. Application Ser. No. 097,903, for: COMMUNICATIONS RECORDING HAVING A UNIQUE IDENTIFICATION CODE AND SECURE METHOD AND APPARATUS FOR CHANGING SAME.

U.S. Application Ser. No. 097,899, for: MODULAR CONFIGURABLE COMMUNICATIONS RECORDER.

U.S. Application Ser. No. 097,905 for: APPARATUS FOR SECURING ACCESS TO A COMMUNICATIONS RECORDER.

BACKGROUND OF THE INVENTION

1. Field of the Invention

This invention relates to communications monitoring and "logging" equipment; and more particularly relates to recording equipment used for recording all communications received or sent over a number of communications channels over substantial periods of time.

Communications loggers typically are used to make continuous or nearly continuous recordings of all telephone or radio communications to and from a single location, such as a police station or fire station. Typically, loggers are multi-channel magnetic tape recorders which record communications on each of a substantial number of telephone lines in closely spaced parallel tracks on a magnetic tape.

Because of the critical importance in many applications of communications recorders, such systems must meet many special requirements. Thus, such system should provide the capability to provide back-up monitoring of critical channels. Further, because of the highly variable nature of particular applications; which may involve from a few to hundreds of communications channels to be monitored, and where the importance of back-up protection may vary, both from application to application and from channel to channel, it is highly desirable that communications recorders be of a modular form readily adaptable to different applications. It is also highly desirable that such various configurations of communications recording systems include a system of user interaction which is readily adapatable to various configurations, and which enables a user to easily determine status and other information relating to particular channels.

Also because of the critical nature of the information recorded in many applications, security of communications recording systems is critical. Two aspects of this security are identification of the particular system which generated a particular tape and physical security of tapes being recorded.

In prior systems it was known to identify particular tapes by recording a unique identification code on a tape as it was being recorded, typically by modulating the guard tone on a selected channel. However, from time to time, problems arose when it became desirable to change this identification number, for example, when a system was physically relocated, since the identification number was hardwired or otherwise unalterably recorded in the system.

Security of tapes was provided in prior systems by generally limiting access to the system to trusted personnel. Limiting access in this manner, however, created problems for low level tasks such as changing full tapes when needed.

2. Objects of the Invention

Thus, it is an object of the subject invention to provide a system for monitoring signals received on at least one communication channel having improved back-up capability.

It is another object of the subject invention to provide failsafe back-up capability in such a system.

It is still another object of the subject invention to provide back-up capability in a system for monitoring communications which includes a system control unit where back-up capability is provided even in the event of failure of the system control unit.

BRIEF SUMMARY OF THE INVENTION

The above objects are achieved and disadvantages of the prior art are overcome in accordance with the subject invention by means of a system for monitoring signals received on at least one channel which includes; a first recording apparatus for recordIng signals from each of the channels; a second recording apparatus for recording signals from each of the channels; and control apparatus for controlling the operation of the first and second recording apparatus. The control apparatus operates to, initiate operation of the first recording means under predetermined conditions; halt operation of the first recording apparatus and initiate operation of the second recording apparatus under second predetermined conditions; and periodically request and receive status information from the recording apparatus. Further, the recording apparatus further includes recorder control apparatus which responds to the periodic status information request. The recorder control apparatus detects failure to receive the periodic status information request and thereupon enters a stand-alone mode; and initiates operation of the second recording apparatus in the event of a failure while in the stand-alone mode.

In another preferred embodiment of the subject invention, the record apparatus may include first and second groups of amplifiers for amplifying the received signals and the recorder control apparatus monitors the received signals and selectively switches from one group of amplifiers to the other upon failure of the received signals.

In another preferred embodiment of the subject invention, the back-up recording apparatus is selected by establishing a hard-wire connection between the primary recording apparatus and a second recording apparatus, connecting the second recording apparatus to receive the same signals; and the control apparatus stores information identifying the primary and secondary record apparatus.

Thus, it can be seen that the subject invention overcomes the disadvantages of the prior art and achieves the above objects. However, other objects and advantages of the subject invention will be apparent to those skilled in the art from consideration of the detailed description set forth below and the attached drawings.

BRIEF DESCRIPTION OF THE DRAWINGS

FIG. 2 is a schematic block diagram of the control architecture for the system of FIG. 1.

FIG. 11 is a representation of the page used to input system information.

FIG. 12 is a representation of a page used to input further system information.

DETAILED DESCRIPTION OF THE PREFERRED EMBODIMENT

Figure 1:
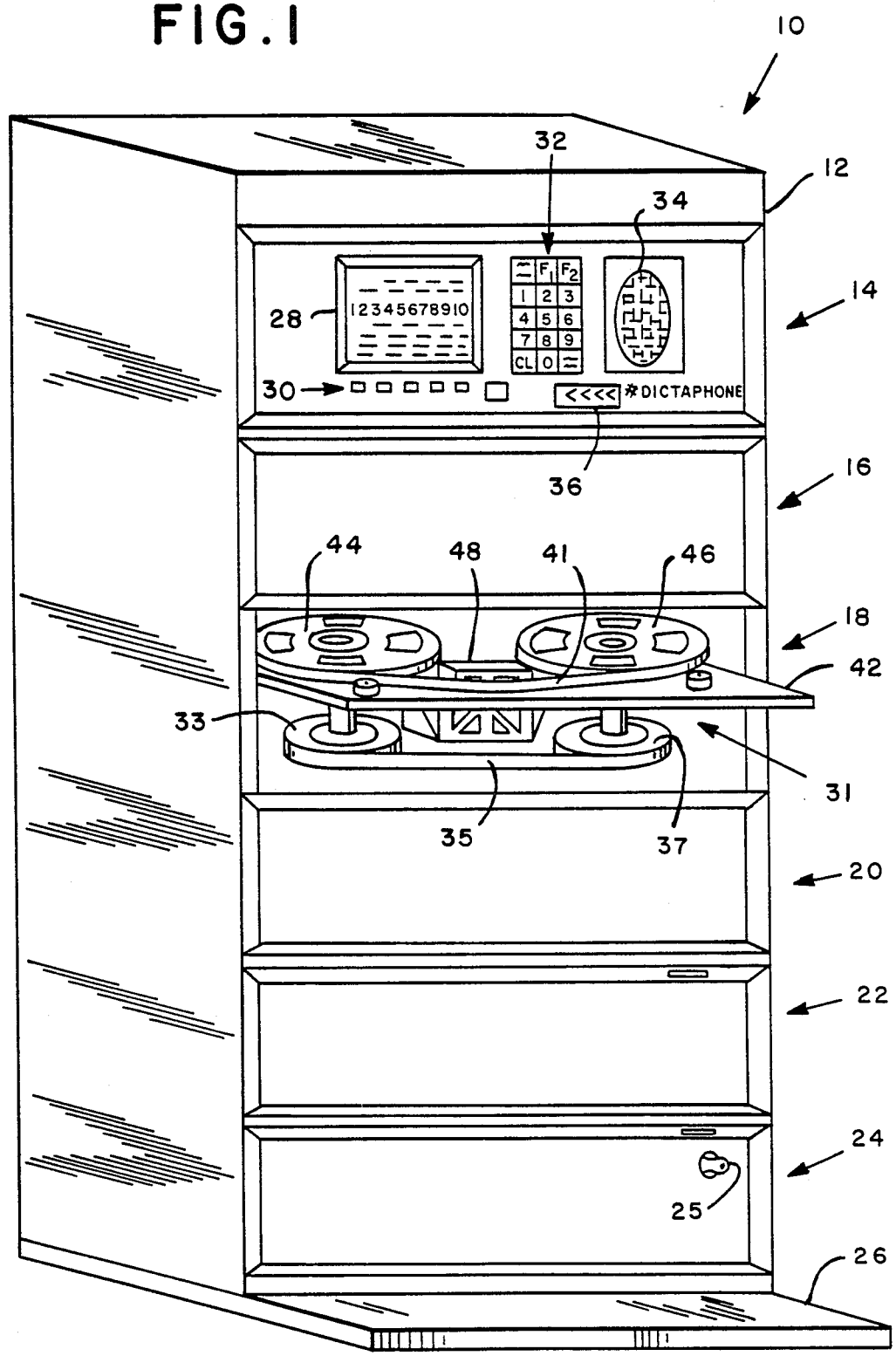
FIG. 1 is a prospective view of a system in accordance with the subject invention.

FIG. 1 illustrates one embodiment of a communications logger 10 with which the present invention may be used. Logger 10 includes a cabinet 12 resting on a base 26 and a plurality of different sections or "bays" 14,16,18,20,22, and 24 in cabinet 12 in which are mounted separate modules which combine to form logger 10. Bays 16–24 each have removable covers. Bay 18 has been shown with the cover removed in order to illustrate its contents. Bays 18 and 20 are equipped with processor controlled electro-mechanical locks which are controlled by logger 10 in a manner more fully described below.

Top bay 14 contains a controller which controls the operation of logger 10 with the aid of CRT 28, a plurality of push button controls 30, a keypad 32, loud speaker 34, and manual speed control 36. The function of these controls is explained more fully with reference to FIG. 2 below.

Bay 16 is an option bay to contain optional accessory equipment such as a rerecord module or an activity monitor module. The use of rerecord modules, and other accessory modules is known in connection with previous loggers and will not be discussed further here in connection with the subject invention. The activity monitor module is described more fully below in connection with FIG. 2.

Bay 18 contains tape deck (hereinafter sometimes "record deck") 31. The front panel of bay 18 has been removed to show tape deck 31 which has been moved out on slides (not shown) to give access to the tape deck equipment. Tape deck 31 is substantially a conventional tape deck similar to those used in previously known loggers with minor modifications to provide for horizontal mounting and the addition of dc motors. Such minor modifications would be readily apparent to one skilled in the art and will not be discussed further here in connection with the subject invention.

Bay 20 contains an optional second tape deck 31. The optional tape deck in bay 20 may be used as a back-up for tape deck 31 to provide continuous monitoring of the channels in case of failure of deck 31, in a manner which will be more fully described below, or simply when the tape on deck 31 is full and must be changed.

Bay 22 contains recording amplifier equipment more fully described below.

Bay 24 contains the power supply for logger 10. A key-operated on/off switch 25 is provided to enable the user of logger 10 to limit those who may turn power on and off for the system. This tends to prevent unwanted disablement of logger 10; an important feature since, in many applications, continuous monitoring of the channels is critical. Still referring to FIG. 1, tape deck 31 includes a base plate 42 two tape reels 44 and 46, a plurality of recording/reproducing heads 48, and magnetic tape 41. Two fly wheels 33 and 37 are joined by a drive belt 35, and drive capstans connected to reels 44 and 46 to move tape 41 pass heads 48 for recording and reproducing.

In operation, a plurality of communications lines such as telephone lines or other communications links (hereinafter referred to as channels) are connected to logger 10 through couplers. All incoming or outgoing calls on each channel are recorded on one of the tape decks.

In the embodiment shown the tape decks are capable of operation with varying widths of tape and may record up to 60 channels on a single one inch tape.

Couplers are circuits which are used to interface logger 10 to various channels, typically telephone lines. Couplers may be either conventional circuits used with previously known loggers or maybe Universal Input Coupling Apparatus.

Those skilled in the art will recognize that the system of logger 10 in not inherently limited to only two tape decks, but is only limited by the capacity of the system controller to provide the necessary real time control. In practice the system, as will be described further below, has been found capable of expansion to at least four tape decks, as well as additional auxiliary devices; and the embodiment described herein has been chosen for ease of illustration and description.

Turning to FIG. 2, a schematic diagram of the control architecture for logger 10 is shown.

Logger 10 comprises five major functional assemblies: power supply module, couplers, record amplifiers, record decks, and a controller assembly. The power supply module is substantially conventional and will not be described further here except to note that a back-up power supply and battery back-up are preferable because of the importance of uninterrupted operation in many communications logger applications. As noted, couplers used in the embodiment described herein are described in the above mentioned commonly owned patent application and operate essentially independently of system control to provide an interface function to the channels being monitored. Accordingly, no further detailed description of the operation of the couplers is believed necessary to an understanding of the subject invention. The record amplifiers are essentially conventional audio amplifiers which will be described further below. System control is provided in a hierarchical fashion by the controller assembly and the controllers for the record decks as will be described with respect to FIG. 2. These modules may be interconnected in numerous ways to provide loggers adapted to particular applications, hereinafter referred to as "configurations".

In FIG. 2 the control architecture for the embodiment described herein is shown. The controller assembly includes a system controller 50, which is provided with electrically erasable programmable read only memory (EEPROM) 51. Controller 50 communicates with the various components of logger 10 over a substantially conventional serial communications bus 52. Bus 52 provides a 187.5 kilobaud channel over which controller 50 polls each device on the channel once every 62.5 milliseconds. Controller 50, as well as all other controllers in logger 10, is a microprocessor based controller using a model 8051 commercially available integrated circuit microprocessor available from the Intel Corporation, as well as other semiconductor manufacturers.

Programming of controller 50, and other microprocessor based controllers in logger 10 to implement the various features and functions described below requires, in general, only the implementation of well known programming techniques, such as screen (i.e. page) generation and serial communications between processors, which are well within the ability of those skilled in the art. Accordingly, detailed description of the coding and program structure are not believed necessary to an understanding of the subject invention.

The controller assembly also includes an input/output controller (hereinafter CRT controller) 54 which controls the user interface through CRT 28, keys 30, and keypad 32, in a conventional manner well understood by those skilled in the art.

Control of the system is primarily through the display of various predefined patterns of information displayed on CRT 28 (hereinafter "pages") and keys 30. Keys 30 include five softkeys 30s which control various functions defined under computer control for each page, and back key 30b which is a defined key which is used primarily to return to the previously displayed page. Additionally, information may be entered through keypad 32 which has 15 defined keys including digits 0-9, clear, enter, and alarm off keys, and two reserved keys which maybe used for additional functions in later models.

The controls also include a speaker 34 which maybe used to listen to a selected channel or channels, either the input signal or the recorded signal. An audible alarm (not shown) is also provided to warn operators of critical system failures. Control 36 is a conventional extended touch sensitive control which maybe used to control the forward or reverse speed of a selected tape deck for manual searching of a tape; tape speed and direction being determined by the point at which control 36 is touched.

Logger 10 provides for up to four remote controllers which include controllers 54r which are essentially identical to controller 54 and provide an operator interface through an additional set of remote controls. System controller 50 is programmed to lock out other controllers once control is asserted through one of controllers 54 or 54r; however, CRT controller 54 has the ability to override remote controllers 54r if the operator attempts a second time to assert control after a warning that the system is already in use through a remote controller.

Record decks 31 are controlled by identical deck controllers 60-1 and 60-2. Controllers 60 provide instantaneous control for the record decks; placing the decks in various operating modes such as ready, record, fast forward, etc. and monitoring the status of the deck to assure correct operation. In normal operation the record decks are controlled by an operator through system controller 50 but, since instantaneous control is provided locally, failure of controller 50 or communications line 52 will not interrupt operation of the record decks. Controllers 60 monitor the outputs of preamplifiers which amplify the recorded signals for each channel recorded on the record deck over a plurality of lines 62 to detect either the presence of audio information or of a guard tone in a manner which will be described further below.

Controllers 60 also write a time signal onto a selected channel, typically channel 3, over line 64 and continuously monitor the recorded time signal over line 66. Time code is generated and written on a tape by controllers 60. System synchronization is achieved by having system controller 50 update controllers 60 every cycle via line 52. Failure of controller 50 will be sensed by controllers 60 which will then keep time based on their own crystals, and when communications are reestablished controller 60 will again synchronize the deck time.

Time code will be written (with a three digit machine number and deck number) in year, month, day, hour, minutes and seconds on a selected channel on a tape in a predetermined format by modulating the guard tone recorded on the selected channel. Modulating the guard tone allows the selected channel to be also used to record an audio signal. Logger 10 is capable of maintaining synchronization either from an internal crystal or from externally generated one second pulses, and also of translating broadcast IRIG-E code and recording the translated code on tape. (IRIG-E code is a known code used for broadcast of time signals.)

A plurality of lines 70 is provided to control the functions of the record decks and a plurality of lines 72 is provided to receive various status signals from the record decks.

Local controls 74 are provided to allow for direct manual operation of the record decks.

As will be described below signals to be recorded are first amplified by banks of record amplifiers. In selected configurations each record deck maybe provided with both primary and back-up record amplifiers which are selected by controllers 60 over lines 76a and 76b in a manner which will be described more fully below.

Because recorded communications may have critical value, for example as evidence, the bay containing each record deck is provided with an electromechanical lock which is controlled by a processor 60 over lines 78. Solenoid 80 will withdraw bolt 82 against the force of spring 84 when energized. Solenoid 80 is controlled by switch 86, preferably located in the bay door handle, and transistor 90, which in turn is controlled by line 78 so that when transistor 90 is energized and switch 86 is closed, bolt 82 is withdrawn. The open or closed state of each bay is sensed over line 79 by processors 60.

The rules governing the bay lock logic are as follows:

1. If one deck is enabled for unlocking, all others are disabled and locked to prevent the cabinet from topling.

2. If no password is entered all decks are disabled and locked.

3. If a password level 1 is entered, then all record decks which are in READY or RECORD and do not have a guard tone failure must be disabled and locked. Other decks maybe unlocked by a user with a level 1 password (a "tape changer") to allow full tape or tapes which have a guard tone failure to be changed.

4. Any record deck in RERECORD is locked for all password levels except level 4 (the service level). (RERECORD is a function wherein the contents of one channel of a selected tape are rerecorded onto an auxiliary recording device.)

5. If logger 10 is in use by a remote controller, all bays are disabled and locked.

A key operated mechanical linkage 92 is provided to mechanically override spring 84 and withdraw bolt 82 in the event of a system failure.

In FIG. 2 a configuration is shown wherein controller 60-2 controls a tape deck as a back-up to the record deck controlled by controller 60-1. This back-up status is established by a hardwired linkage 94 which connects controller 60-1 to controller 60-2. As will be described further below, system controller 50 may direct back-up controller 60-2 to begin monitoring of the channels in the event a failure is detected when status is returned by controller 60-1. Alternatively if controller 60-1 is operating in a stand alone mode because of a failure of system controller 50 or communications line 52, controller 60-1 may initiate the transfer to controller 60-2 when it detects a failure by transmitting a signal over line 94.

Activity monitor 96 is a processor controlled device which receives a block of data once each cycle from system controller 50 defining the active or inactive state of each of the channels monitored by logger 10. Monitor 96 maintains periodic and cumulative records of this information which maybe printed out in a conventional manner on printer 98 upon request by a user. System processor 50 scans the record amplifiers sequentially by addressing groups of amplifiers over a plurality of lines 100 and receiving status back for that group over a plurality of lines 102. This sampling of the record amplifiers will be described in more detail below.

System processor 50 is also connected through serial communications line 52 to groups of preamplifiers to control the scanning of information received by processors 60 on line 62 in a manner which will be described more fully below.

Figure 3A:
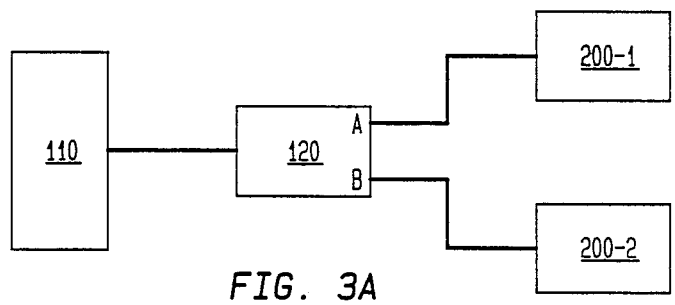
FIGS. 3a–3d are schematic block diagrams showing possible configurations of the system of FIG. 1.

FIGS. 3A–3D show possible configurations having two record decks. In FIG. 3A up to 60 channels are connected through a group of couplers 110 to a group of record amplifiers 120. Record amplifiers 120 are provided with switchable outputs A and B which operate under control of processor 60 in a manner which will be more fully described below. In FIG. 3A record deck 200-1 is connected to output A and back-up record deck 200-2 is connected to output B.

Figure 3B:
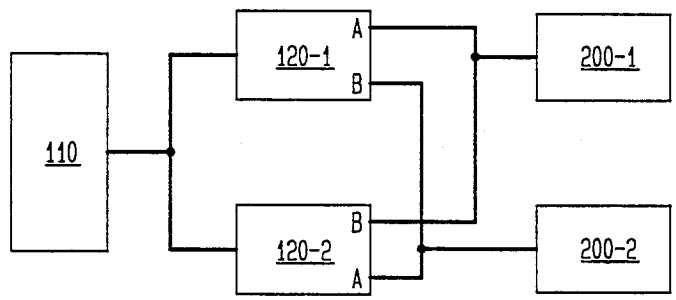

In FIG. 3B up to 60 channels are connected through couplers 110 to both record amplifiers 120-1 and 120-2. Record amplifiers 120-1 function as primary amplifiers for record deck 200-1 and back-up amplifiers for back-up record deck 200-2. Record amplifiers 120-2 function as primary amplifiers for back-up record deck 200-2 and back-up amplifiers for record deck 200-1.

Figure 3C:
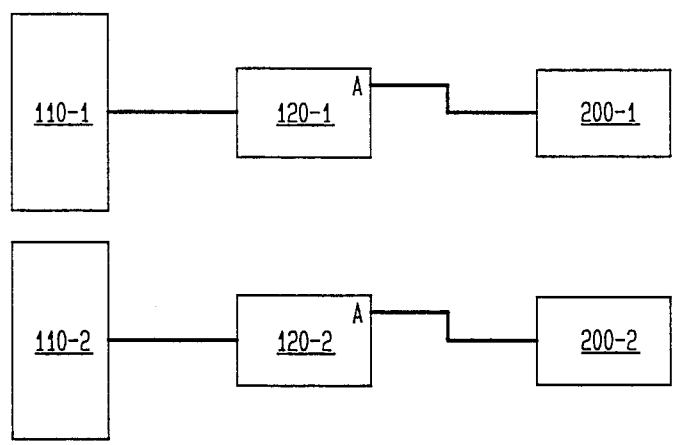

In FIG. 3C up to 120 channels are connected to logger 10 by connecting up to 60 channels through couplers 110-1, record amplifiers 120-1 to record deck 200-1; and up to 60 channels through couplers 110-2, record amplifiers 120-2 to record deck 200-2, without either back-up amplifiers or record decks.

Figure 3D:
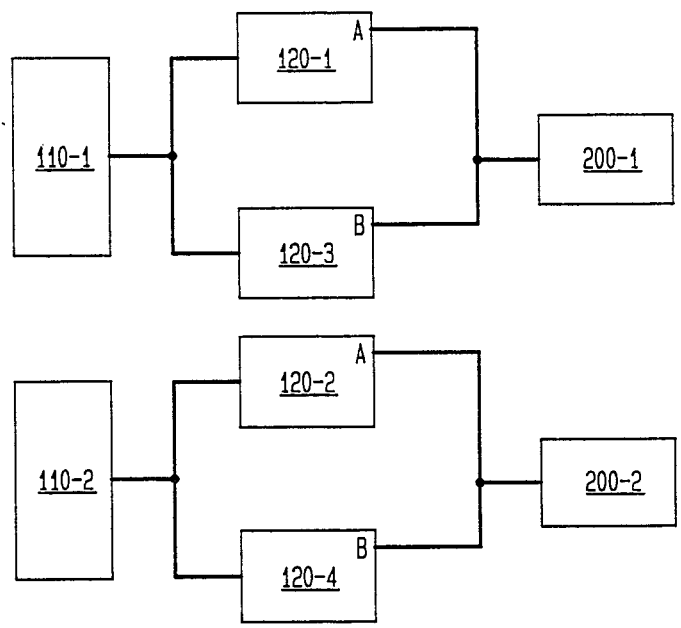

FIG. 3D shows up to 120 channels connected to logger 10 in a manner similar to that shown in FIG. 3C except that back-up record amplifiers 120-3 and 120-4 have been provided.

As can be seen from FIGS. 3A–3D numerous configurations of loggers in accordance with the subject invention are possible. When it is further considered that modules mounted in various locations may serve any of the functions shown and that configurations may also have various auxiliary functions, remote controllers, auxiliary power supplies, etc. it will be recognized that a vast number of configurations are possible. Accordingly, logger 10 includes a novel and particularly convenient manner for entry of configuration information into the memory of system processor 50 as will be described further below.

As noted above, users of logger 10 control its operation by entering signals through controller 54 (or controller 54R) using keys 30 and keypad 32 in conjunction with CRT screen 28. Screen 28 displays predetermined patterns of information (hereinafter "pages") and users may either initiate certain functions of logger 10 or move to selected pages by operation of keys 30 and keypad 32.

The primary keys for controlling logger 10 are softkeys 30S which are mounted directly below screen 28. For each page displayed a new set of functions is defined for the five softkeys 30S, which are indicated by captions displayed on screen 28 substantially directly above each of softkeys 30S. Back key 30B is generally dedicated and returns a user to the previous page when activated. Keypad 32 is used to enter information such as passwords, as needed, as will be described further below, with the clear and enter keys functioning in the conventional manner.

Figure 4:
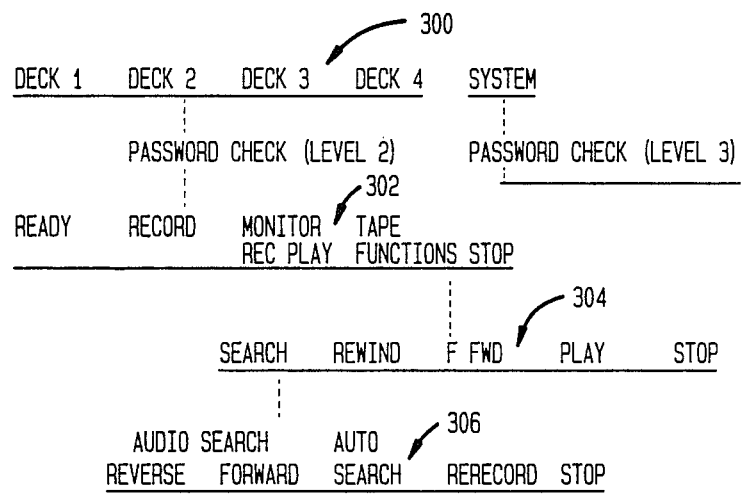
FIG. 4 is a schematic diagram showing the hierarchy of pages displayed by the system of FIG. 1 and the functions activated by associated softkeys for each displayed page for operation of the system of FIG. 1.
Figure 5:
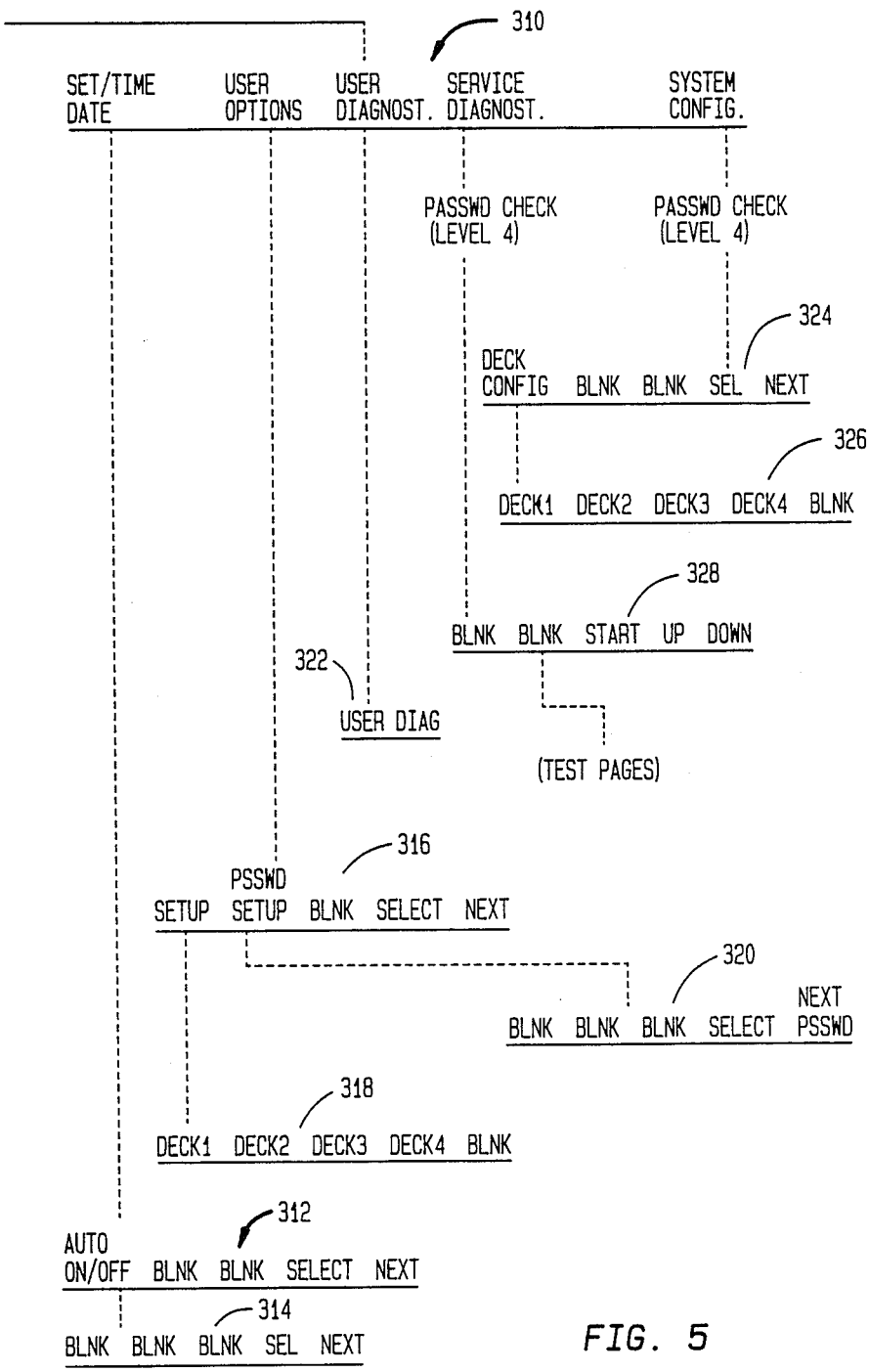
FIG. 5 is a schematic diagram of the hierarchy of pages displayed by the system of FIG. 1 to enable a user to access various system functions, and the associated functions activated by the associated softkeys for each page displayed.

In FIG. 4 the hierarchical pattern of pages displayed in controlling logger 10 is shown in schematic fashion. For each page the captions displayed above each of softkeys 30S is shown. Activation of each key will result either in activation of a selected system function or transfer to another page at a different level of the hierarchy. At 300 the softkey functions for the first page, hereinafter some times referred to as the front page, are shown. No functions may be initiated from the front page which cannot be left without entering a proper password. The lowest level password which allows access to further system functions is a level 2 password. Entry of a level 1 password only enables the electromechanical locks on bays 18 and 20 to allow a low level "tape changer"user to access recording units in those bays when it is necessary to change a tape because it is finished, broken, jammed, or for some similar reason.

Note that in accordance with the logic described above, locks on bays 18 and 20 are only enabled when it is appropriate to change a tape. Tapes in record, or ready, or rerecord are not accessible to the tape changer to prevent accidental or deliberate destruction of information.

In a preferred embodiment, after a new tape is mounted by a tape changer a series of self diagnostic tests is run on the selected record deck automatically after the tape changer places the record deck in the ready mode, (wherein the record deck has a tape mounted and is ready to enter the record mode), is run under the control of system controller 50. In these tests a low frequency tone, typically approximately 500 Hz., is internally generated in logger 10 and recorded on each channel. A guard tone is also recorded on each channel and on the selected time channel, typically channel 3, the guard tone is modulated with time code information as described above. After approximately 10 seconds each channel is tested for failure to record the low frequency tone and channels failing the test are displayed on screen 28.

The test is then repeated with a second internally generated high frequency tone, typically 3 Khz. During these tests the guard tone is also monitored and the recorded time codes on channel 3 are read back by system controller 50 and checked for errors.

Use of guard tones is well known in the communication recorder field. Such tones consist of narrow band signals outside the audio frequency band which are internally generated by the logger and mixed with each incoming signal. the logger monitors each channel for the presence of the guard tone to be sure that the entire chain from record amplifiers to preamplifiers is continuously functional. Use of a signal outside the audio frequency range allows each channel to be monitored continuously even though quiet, without interfering with the signal information when the channel is active.

Returning to FIG. 4, the first four softkeys are used to select a particular record deck for operation by a user. Note that while the preferred embodiment discussed herein is a two deck embodiment configurations having up to four decks have been demonstrated in loggers in accordance with the subject invention. Activating one of the first four softkeys causes a display requesting entry of an appropriate password, which must be a level 2 or higher password. If the proper password is entered through keypad 32, screen 28 then displays the second page 302, sometimes hereinafter referred to as the record page. On record page 302 the first softkey may be used to place the selected record deck in the ready mode, the second softkey places the selected record deck in the record mode, and the third softkey enables the user to monitor the signals through speaker 34. Continued activations of the third softkey on record page 302 causes the monitor function to toggle back and forth between monitoring the signal at the output of record amplifiers 120 and monitoring the signals at the output of playback amplifiers 210 (shown in FIG. 8). The fourth softkey transfers to third page 304, sometimes hereinafter referred to as the tape motion page, and the fifth softkey activates the stop function to stop the selected tape deck.

On page 304 the second through fifth softkeys activate conventional rewind, fast forward, play, and stop functions for the selected record deck. The first softkey transfers control to page 306, sometimes hereinafter referred to as the search page.

On search page 306 the first and second softkeys activate an audio search function in the reverse or forward directions respectively. In the audio search mode the selected record deck will automatically search for the presence of audio signal on the tape in the manner described in commonly assigned co-pending application serial number 097,904 filed on even date herewith. The third softkey activates an auto-search function. The auto-search function searches for messages recorded at a selected time.

The fourth softkey activates the rerecord function which causes logger 10 to transfer the signal on selected channel(s) to an auxiliary rerecord device. In the rerecord function logger 10 searches for audio in essentially the same manner as in the audio search function from the present point on the tape until a selected time. Because rerecord is often used to retrieve information from logger 10 for evidentiary purposes no tape motion functions are permitted on the deck which is in rerecord. The rerecord function may be exited by activating a stop function two times consecutively.

The fifth softkey on page 306 again activates a stop function.

When each of the search functions is activated, the user is prompted on screen 28 to select one or more channels for searching and enter various parameters such as search times through keypad 32.

Returning to page 300, the fifth softkey is used to enter a series of pages which control various system functions. When the user activates the fifth softkey on the front page, he is prompted to enter a password through keypad 32. The user must enter a level 3 or higher password to access the system functions. After successful entry of a level 3 password by a high level user, screen 28 displays page 310. The first softkey allows the high level user to set the date and time, the second allows the high level user to select various options, and the third allows the high level user to run selected diagnostic routines. The fourth and fifth softkeys allow access to further diagnostic routines which are intended for use only by a service person, and allow a service person to enter configuration information into system controller 50 as will be described further below. Activation of either the fourth or fifth softkeys on page 310 prompts the user to enter a level 4 password, which in general will be only provided to service personnel.

Activating the first softkey on page 310 transfers control to page 312. On page 312 the first softkey further transfers control to an auto On/Off function on page 314, which will be described further below. The second and third softkeys are blank, and the fourth and fifth softkeys activate select and next functions with respect to a menu displayed on page 312. This menu (not shown) allows a high level user to enter the time. By using the fifth softkey (next) the user may select between time in hours, minutes, and seconds; the month and day; the day of the week; the year; and indicate whether or not daylight savings time is in effect. The fourth softkey (select) toggles between yes and no responses for the daylight savings line. All parameters and answers are entered through keypad 32 in a conventional manner.

Activation of the first softkey on page 312 transfers to page 314 which allows a high level user to set parameters for automatic transfer from primary to back-up record decks and to establish a schedule of times at which record decks will automatically be placed in record or turned off to avoid unnecessary use of tape at times during which no messages will be received. Page 314 displays a conventional menu and the fourth and fifth softkeys are used to activate select and next functions as described above.

The second softkey on page 310 transfers to page 316 where a menu is displayed which allows the high level user to select various options for system operation. The fourth and fifth keys are again used to activate select and next functions as described above and necessary parameters are entered through keypad 32. Various options include activating an audible alarm and activating the auto diagnostic routine described above, as well as setting various parameters such as the duration of the audible alarm and the duration for which the guard tone must fail before a failure is detected. In general, these options consist of enabling or disabling various features of the system or setting parameters for these features in a conventional menu driven manner and further discussion is not believed necessary for an understanding of the subject invention.

Activating the first softkey on page 316 transfer to page 318 where a high level user may select channels to be monitored for guard tone. Page 318 displays the channel numbers of all channels monitored by a particular record deck and the first four softkeys are used to select a particular deck, the fifth being blank. After selecting a record deck, a high level user may deselect the monitoring of particular channels for guard tone monitoring by using keypad 32. Channels not selected will be displayed in reverse video.

The second softkey on page 316 transfers to page 320 where the fourth and fifth softkeys are used to activate select and next function as described above. Page 320 displays a menu which maybe used by a high level user to enter levels 1, 2, and 3 passwords through keypad 32. The level 4 password used by service personnel is preferably common to all machines and available only to service personnel.

The third softkey on page 310 allows a high level user to activate certain diagnostic programs. The user diagnostic programs are a subset of the service diagnostic programs which will be described below.

The fourth softkey first prompts for entry of a level 4 password and then, upon correct entry of the password, transfers to page 328. On page 328 the first two softkeys are blank, the fourth and fifth softkeys activate up and down functions with respect to a menu list of diagnostic tests displayed on page 328, and the third softkey starts a selected test; transferring control to a corresponding test page for execution of the selected test. The various diagnostic test are essentially conventional test such as a display of all alerts recorded by system processors 50, testing of keypad 32, checking battery and power supply operation, etc.; and are, in general, executed through conventional menu driven software. The diagnostic test also include user executed diagnostics which test for proper record operation in substantially the same manner as the auto diagnostic test described above, using the internal high frequency and low frequency tone generators. The service diagnostic functions controlled from page 328 include all user diagnostics controlled form page 322 plus display of a CRT test pattern and a "change machine number function". With the exception of the change machine number function, which will be described further below, further description of the diagnostic functions is not believed necessary to an understanding of the subject invention.

The fifth softkey on page 310, which also requires a level 4 password, transfers to page 324 which maybe used by service personnel to enter configuration information and operating parameters for storage in system controller 50. As may be seen from consideration of the description so far, logger 10 may readily be configured in many ways. In order for system controller 50 to function properly, it is necessary that this information be recorded for use by the system control program. Because of the critical nature of this information, in general, the system will not operate properly if the configuration is misdescribed in system controller 50, the information is stored in triply redundant form in $E^2$ PROM 51. In controlling the system, system processor 50 will select information on a two out of three basis, correct any errors, and log the failures for later examination during service diagnostic tests, and will detect a failure in the event that there is no correspondence in the triply redundant information. On page 324 the second and third keys are blank and the fourth and fifth keys are used to activate select and next functions with respect to a menu displayed in a manner described above, while the first key transfers to page 326 wherein further system configuration information relating to selected decks is entered.

Figure 6:
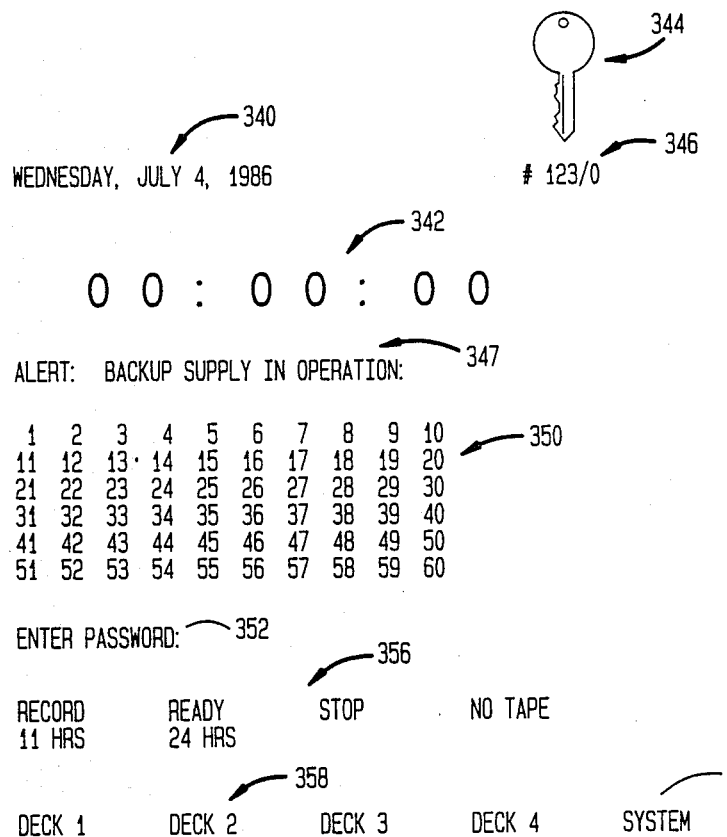
FIG. 6 is a representation of the initial, or front, page displayed by the system of FIG. 1.

In FIG. 6, page 310, the front page, is shown in greater detail. Information common to page 310 and other pages includes the date 340, the time 342 displayed in hours, minutes and seconds, a password level symbol 344 which indicates the level of password currently entered and a unique machine number 346. As described above, this unique machine number is recorded by each record deck with the time code and a deck identification number on the time channel. After the first time a machine number 346 is entered by the customer into $E^2$ PROM 51 thereafter, because of the importance placed by some users on the ability to identify the particular logger on which a given tape was recorded, the machine number may only be changed by use of a special password which can only be obtained from the system manufacturer.

Common information also includes a display of alert conditions such as the fact that a back-up power supply or amplifiers are in operation or that a guard tone failure has been detected on one or more channels.

The front page also displays identification of the channels connected to logger 10 in matrix 350. Since matrix 350 is limited to a maximum of 60 channels, only the low order 60 channels are displayed on the front page. When a particular record deck is selected, other pages associated with the selected record deck show matrix 350 displaying the channels monitored by the selected record deck. Upon transfer to the record page matrix 350 displays the channels monitored by the selected record deck. On the front page and the record page, the displayed channels indicate channel activity with reverse video display. Matrix 350 may also be displayed on pages associated with other functions such as diagnostics to indicate conditions such as the presence of audio in recorded signals, guard tone failures, or channels selected for guard tone monitoring, as well as channel activity. Monitoring of the channels for activity, and the recorded signals for both the presence of audio and the presence of guard tone will be described in more detail below.

Upon activation of any softkey prompt 352 prompts a user to enter his password. Displays 356 display the status of each record deck. Thus, in FIG. 6, which for completeness, shows a four deck system, deck 1 is in record mode and has tape for 11 hours of recording time remaining, deck 2 is in ready mode and has 24 hours of recording time remaining, deck 3 is stopped, and deck 4 has no tape. Display 358 identifies each of the first four softkeys with one of the record decks, which when activated transfers to the record page 312 for the identified deck. Display 360 identifies the fifth softkey with system functions and when activated, transfers to page 310 as described above.

Figure 7:
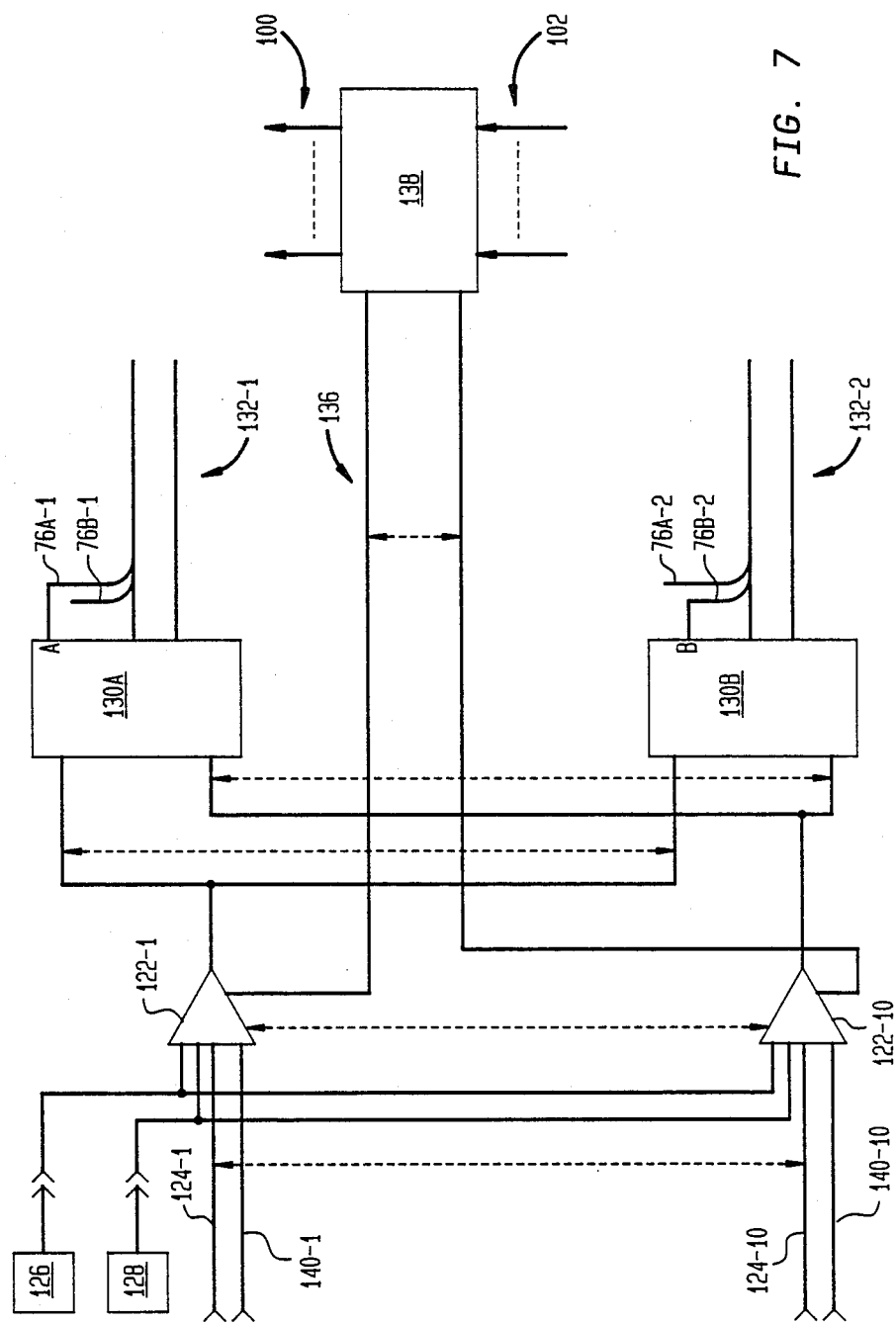
FIG. 7 is a schematic block diagram of a record amplifer module used in the system of FIG. 1.

In FIG. 7 record amplifiers 120 are shown in greater detail. Record amplifiers 122-1 through 122-10 are mounted on a single PC board, which in turn, may be mounted in a motherboard, which will accommodate up to 6 PC boards. The two deck system of logger 10 described in the present embodiment will accommodate two motherboards providing for up to 120 channels, or 60 channels with redundant amplifiers.

Amplifiers 122 receive audio inputs from couplers 110 over lines 124-1 through 124-10 on each PC board as shown in FIG. 7. Additionally, amplifiers 122 receive a guard tone signal generated by guard tone oscillator 126 (preferably two per motherboard) and high and low frequency test tones generated by tunable oscillator 128 (preferably one per motherboard). Guard tones generated by oscillator 126 are combined with audio signals by amplifiers 122 as described above. Test tones generated by tunable oscillator 128 are used in diagnostic tests as described above. Outputs of amplifiers 122 are fed to two banks of remotely controllable output switches 130A and 130B. Switches 130A and 130B are connected to selected tape decks by ribbon cables 132-1 and 132-2. As shown in FIG. 7 the PC board here is connected to tape decks 200-1 and 200-2 in accordance with the configuration of FIG. 3B. Cables 132 include lines 76A and 76B (shown in FIG. 2) from record controllers 60-1 and 60-2. Switch 130A is wired to receive only line 76A while switch 130B is wired to receive only line 76B, thus, as shown in FIG. 7, record controller 60-1 may select the outputs of record amplifiers 122 as its primary source of signals by asserting a signal on lines 76A-1 while record controller 60-2 may select the same amplifiers as its back-up source of signals by asserting a signal on line 76B-2.

In addition to the audio outputs, amplifiers 122 also generate a channel active signal on lines 136 connected to addressable switches 138. Typically, the channel active signals is driven from the automatic gain control signal of amplifiers 122 and indicates the presence or absence of audio information on the associated channel. The signals on line 136 are returned to system controller 50 on lines 100 (shown in FIG. 2) when addressable switch 138 is selected by an address generated by system controller 50 on lines 102 (shown in FIG. 2). Thus, controller 50 may cyclically address all amplifiers in record amplifier assembly 120 to determine the state of channel activity for display as described above.

In other preferred embodiments of the subject invention the channel active signal may be derived from off-hook signals or remote active signals received from couplers 110 and generated in a manner described in commonly assigned copending application serial number DIC-560, for: UNIVERSAL INPUT COUPLING APPARATUS, filed on even date herewith.

Figure 8:
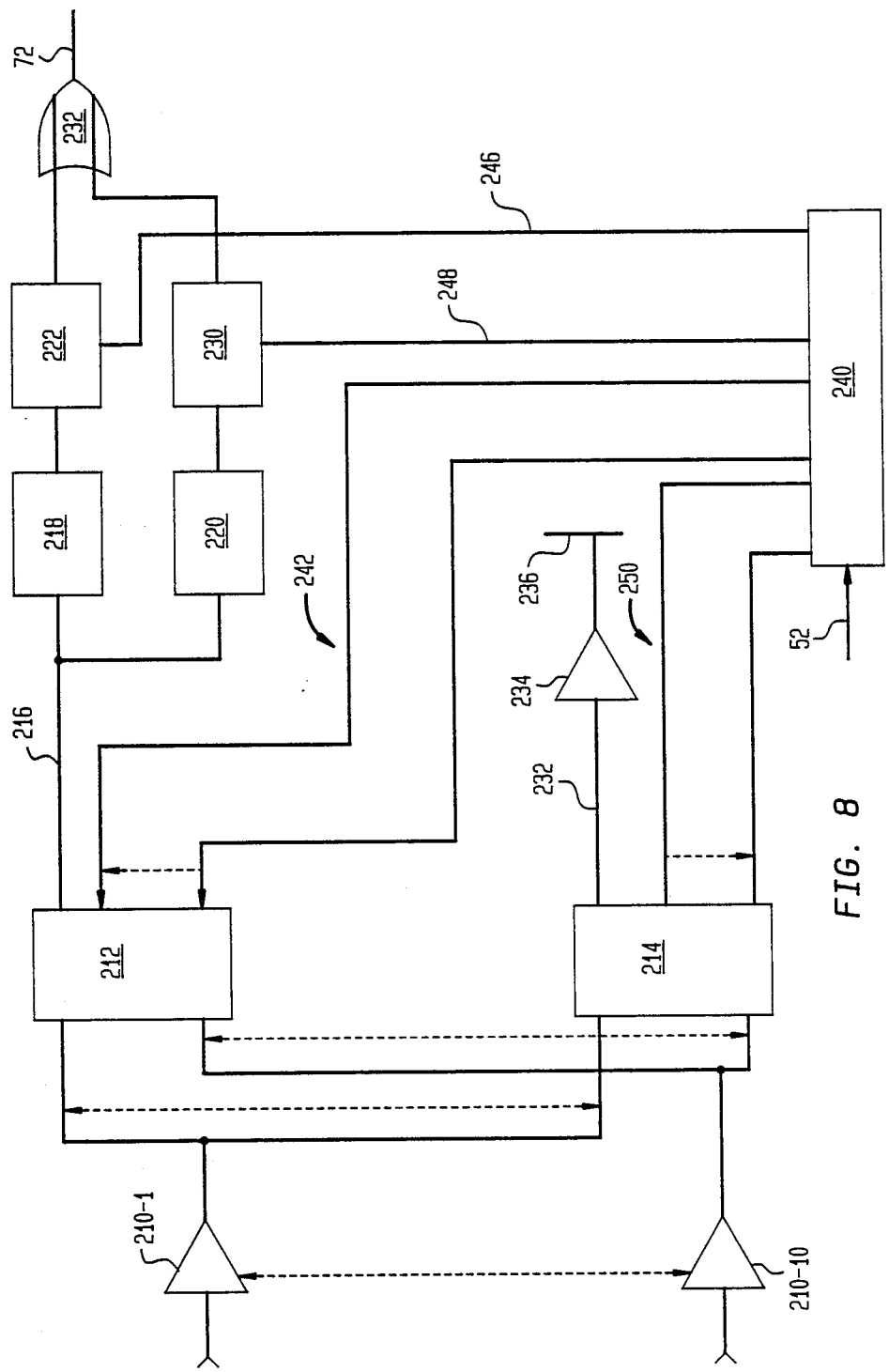
FIG. 8 is a schematic block diagram of a preamplifier module used in the system of FIG. 1.

Turning to FIG. 8, the preamplifier circuits for record decks 200 are shown. Preamplifiers 210-1 through 210-10 are mounted on a single PC board and up to 6 PC boards maybe provided in a given record deck 200. Thus, preamplifiers for up to 60 channels of recorded signals maybe provided. Preamplifiers 210 receive audio signals from playback heads (not shown) in record deck 200. The outputs of preamplifiers 210 are connected to two identical 1-of-10 multiplexers 212 and 214. Output 216 of multiplexer 212 is connected to a band pass filer 218 which passes substantially only the guard tone and a low pass filter 220 which passes substantially only audio information in the recorded signal. Detectors 222 and 230 generate logical signals in response to the output of filters 218 and 220 respectively which are coupled through OR gate 232 to one of lines 72 for transmission to record controller 60.

The output 232 of multiplexer 214 is connected through buffer 234 to audio bus 236 for transmission to speakers 34.

Selection of outputs of preamplifiers 210 is controlled through shift register circuitry 240. Once each cycle system controller 50 addresses shift register circuitry 240 and stores a block of data. This data will cause at most one of lines 242 to be activated to selected at most one of the outputs of preamplifiers 210-1 through 210-10 through multiplexer 212. Simultaneously, either output 246 or 248 will be asserted to enable either detector 222 or 230 to provide a signal representative of either the presence of a guard tone or audio information on lines 72.

The same block of data received by addressable shift register 240 may also contain data enabling one or more of lines 250 to connect the outputs of preamplifiers 210-1 through 210-10 to audio bus 236 through buffer amplifier 234 for playback by speakers 34.

Thus, system controller 50 may selectively control the outputs of preamplifiers 210 to both select either the presence of audio information or of a guard tone signal for monitoring and display, and to select channels for audible playback through speakers 34.

Figure 9:
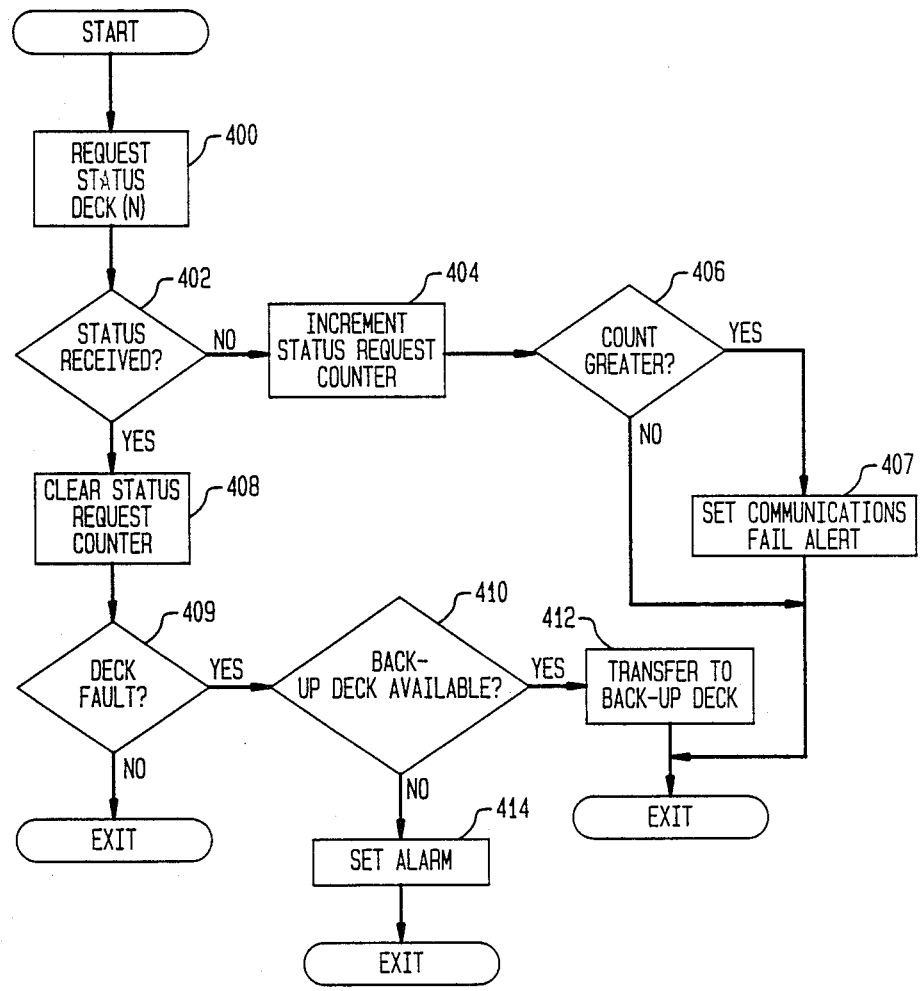
FIG. 9 is a flow chart of the program logic executed by the system controller of the system of FIG. 1 to provide transfer of the recording functions to a back-up recorder.

Turning to FIGS. 9 and 10, the logic for transfer between primary record deck 200-1 and back-up record deck 200-2 is shown. FIG. 9 shows logic executed in system controller 50 to control transfer to back-up recorder 200-2 in the event record controller 60-1 reports a deck fault when returning status information. Further, to assure continuous monitoring of the input channels even in the event of a failure of system controller 50 record controller 60-1 also executes logic to provide for transfer to back-up record deck 200-2 when record deck 200-1 is functioning in a stand-alone mode.

In FIG. 9 at 400 system processor 50 requests status information from a selected deck. At 402 controller 50 tests to determine if status has been returned. If it has not, at 404 a status request counter is incremented indicating failure of record controller 60 in the selected record deck. At 406 controller 50 test to determine if the number of failures to receive status exceeds a predetermined count. If it has, at 407 a communications failure alert is set.

If at 402 status is received the counter is cleared at 408 and at 409 controller 50 determines if the status indicates a deck fault. Deck faults may include out of tape conditions, guard tone failures, and failures of both primary and back-up amplifiers. If such a deck fault is detected, controller 50 again checks for the availability of a back-up record deck at 410. If a back-up record deck is available a transfer tothe back-up is initiated at 412. If no back-up is available an audible alarm is sounded at 414. If no fault is detected, controller 50 exits.

Figure 10A:
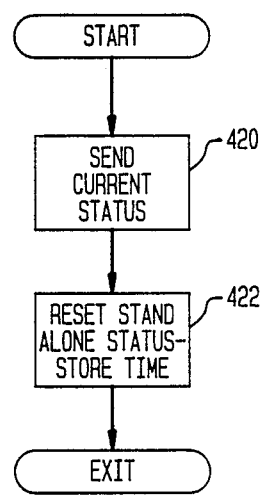
FIGS. 10a–10c are flow charts of the program logic executed by the record deck controllers to povide back-up.
Figure 10B:
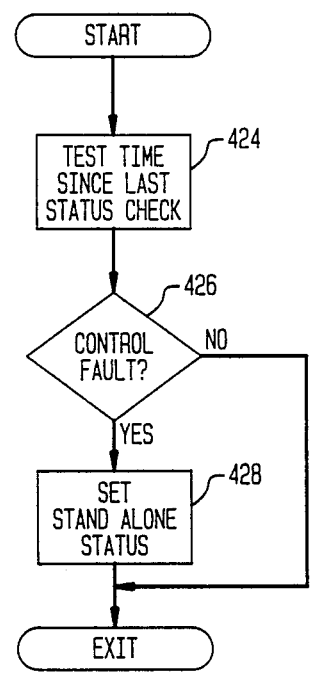
Figure 10C:
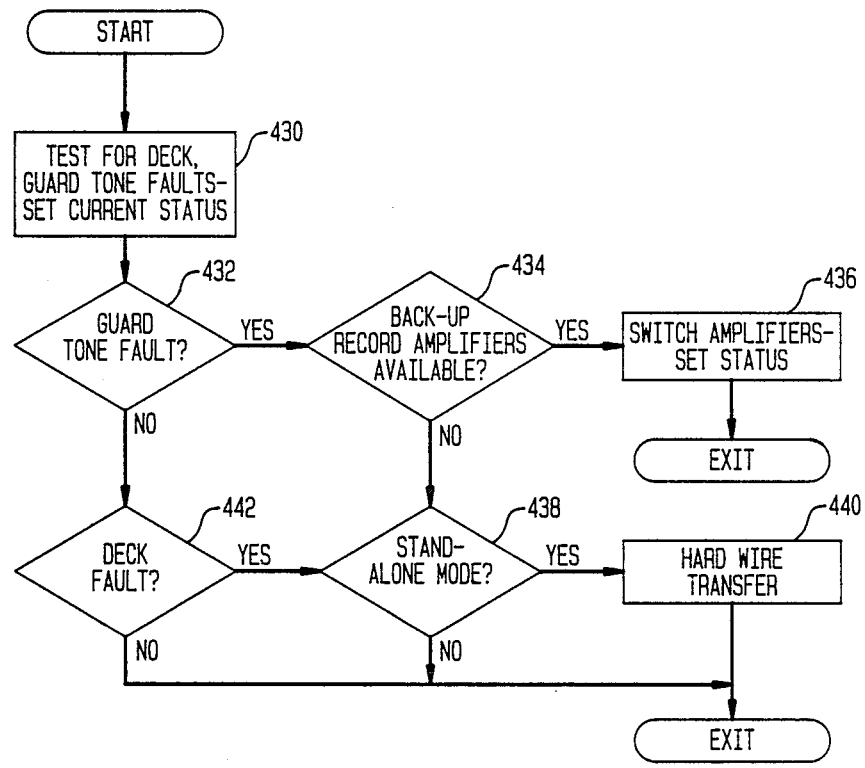

In FIGS. 10A–10C concurrently executing logic in record controller 60-1 is shown. In FIG. 10a, at 420 record controller 60-1 responds to a request for status by sending the current status, then at 422 resets stand-alone status, since the receipt of a request indicates that communications with system controller 50 have been reestablished if they had been previously disrupted, and stores the time, then exits.

In FIG. 10b controller 60-1 test the time since the last status check at 424. At 426 it determines if a control fault has occurred (i.e. if the time exceeds a predetermined interval). If not, it exits, and if it has, at 428 it sets stand-alone status and exits.

In FIG. 10c record controller 60 tests for deck or guard tone faults in its associated record deck 200 and sets the current status for later transmission to system controller 50. At 432 it determines if a guard tone fault has occurred.

At 434 controller 60 determines if back-up record amplifiers are available. Back-up amplifiers might not be available either because the selected configuration does not include them, or because controller 60 had previously switched amplifiers. If back-up amplifiers are available at 436, controller 60 switches amplifiers, typically by asserting a signal on line 76b and deasserting a signal on line 76a, sets status to indicate that the amplifiers have been switched, then exits.

If no back-up amplifiers are available at 438, controller 60 determines if it is in stand-alone mode. If it is in stand-alone mode, controller 60-1 asserts a signal on line 94 to initiate a hard-wired transfer to controller 60-2 and record deck 200-2. If controller 60-1 is not in standalone mode, it exits. If, at 432 there is no guard tone fault at 442, controller 60-1 test for a deck fault. If a deck fault has occurred at 438, it again test to determine if it is in stand-alone mode and continues as described above. If there is no deck fault, controller 60-1 exits.

Thus, it can be seen that logger 10 provides for a transfer to an available back-up record deck even in the event of failure of system controller 50.

As can be seen from the above description, it is essential that system controller 50, as well as record controllers 60 have available information relating to the configuration of logger 10. Thus, as just described, system controller 50 could not properly execute a transfer to a back-up record deck 200 without knowledge of which decks were primary decks and which were their backups. Nor could record controller 60 properly switch to back-up amplifiers if it did not know if back-up amplifiers were available. Thus, in accordance with the subject invention a novel and particularly efficient manner of entry of this information has been provided.

If on page 310 a service person activates the fifth softkey and enters the proper level 4 password, the system transfers to page 324 which is shown in detail in FIG. 11. Page 324 displays common date 340, time 342, password 344, machine number 346, and alert 347 information as described above. Additionally, page 324 displays a menu 500 and the service person may use the fourth and fifth keys to enter system configuration information and operating parameters by activating select and next functions as described above. (Operating parameters define modes of system operation which do not depend on the system configuration, for example "Record Speed"). At line 502 the service person may enter the number of remote CRT's through keypad 32. At line 504 the service person may indicate whether logger 10 is equipped for remote data. At line 506 a record speed of 15/32 or 15/16 of an inch per second maybe selected. At line 508 calendar display of month/day, day/month or Julian maybe selected. At line 510 24 hour or 12 hour time display maybe selected. At line 512 either continuous operation or voice activated operation (vox) maybe selected. At line 514 the service person may indicate whether a single or double power supply has been provided. At line 516 the service person may indicate whether or not a back-up power supply has been provided. And, at line 518 the synchronization source maybe indicated.

Activation of the first softkey transfers to page 526, which maybe used by the service person to enter configuration information pertaining to a selected deck. Page 526 is shown in detail in FIG. 12. Again, common information as displayed as described above. Additionally, menu 530 is shown which maybe used by the service person to enter configuration information relating to a selected deck. A deck is first selected by activating one of the first four softkeys. Afterwhich, at line 52 keypad 32 may be used to enter the number of channels monitored by the selected record deck. At line 534 the back-up deck and back-up amplifiers maybe identified. At line 536 the primary amplifier maybe identified. At lines 538 and lines 540 locations of the available amplifiers in terms of the card slots used, maybe entered. At lines 542 the range of channels monitored by the selected record deck are indicated. It should be noted that in two deck systems such as logger 10 up to 120 channels, 60 by each deck, maybe monitored; while in larger systems, up to 240 channels maybe monitored. Thus, to be able to properly display channel status associated with a selected record deck, controller 50 must know which channels are monitored by which decks. Finally, at line 544 the service person may indicate whether or not back-up amplifiers are provided. Thus, it can be seen that the information entered on page 326 defines the system configuration such as those shown in FIGS. 3A–3D, as well as other possible configurations.

As noted above this configuration information is stored in triply redundant form in $E^2$ PROM 51 in order to minimize the possibility of its inadvertent loss. Periodically, controller 50 downloads configuration information needed by record controllers 60, such as the availability of back-up amplifiers, so that it is not necessary to provide protected storage for each record controller 60.

As noted above a service person may execute a change machine number function from service diagnostic page 328. This function is not, properly speaking, a diagnostic function, but rather allows the service person to change the machine number which is recorded on each tape with the time code. However, since it is frequently critical to be able to identify which machine a given tape was recorded on, the changed machine number function is unique and requires a special one time password, which is not known by the user or service personnel.

Figure 13:
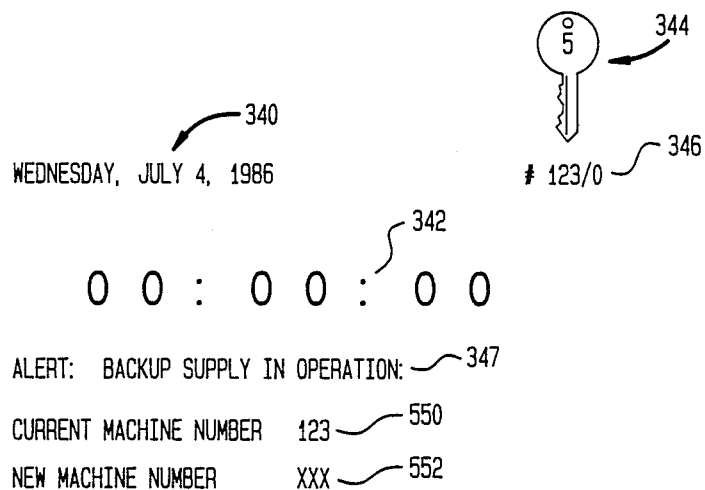
FIG. 13 is a representation of a page used to change the machine identification number.

When a service person attempts to execute the change machine number function from page 328, the enter password prompt appears and the service person must enter a unique onetime password. To obtain this password, the service person calls the manufacturer and, after properly identifying himself to the manufacturers satisfaction, provides the manufacturer with the current machine number and the date and time as displayed on logger 10. The manufacturer then uses this information together with a secure algorithm known only to the manufacturer to generate a unique one-time code as a function of the date, time and previous machine number. Once this password is entered by the service person, logger 10 transfers to the changed machine number page shown in FIG. 13. Again, the common date 340, time 342, password 344, machine number 346, and alert 347 information are shown. At line 550 the current machine number is displayed. At line 52 the service person may enter the new machine number through keypad 32 once the one-time password has been entered and recognized by a logger 10. Logger 10 will continue to recognize the password and the service person may make more than one attempt to change the machine number until logger 10 is "locked". (Logger 10 is locked by returning to the front page and again activating back key 30B.) Once the number has been finally changed and logger 10 locked, logger 10 will no longer recognize the unique one-time password, and in order to change the machine number again, a new password must be obtained from the manufacturer. Preferably the one-time password is only recognized for a limited, predetermined period.

The above description of preferred embodiments of the subject invention has been provided by way of illustration only and those skilled in the art will recognize other possible embodiments from consideration of the above description and the attached drawings. Accordingly, limitations on the subject invention are to be found only in the claims set forth below.

What is claimed is:

1. A system for monitoring signals received on at least one channel, comprising:
    (a) first recording means for recording signals received on said at least one channel;
    (b) second recording means for recording signals received on said at least one channel,
    (c) system control means for controlling the operation of said first and second recording means, said control means being further for:
        (c1) initiating operation of said first recording means upon occurrence of one of a set of first predetermined conditions;
        (c2) halting operations of said first recording means and initiating operation of said second recording means upon occurrence of one of a set of second predetermined conditions; and,
        (c3) periodically requesting and receiving status information from said first and second recording means; and
    (d) said first recording means further comprising recorder control means responsive to said periodic information requests for:
        (d1) detecting failure to receive said periodic status information requests and thereupon entering a stand-along mode; and,
        (d2) initiating operation of said second recording means upon occurrence of one of a third set of predetermined conditions when in said stand-alone mode, whereby continuous monitoring is maintained in the event of failure of said system control means.

2. A system as described in claim 1 wherein said system control means receives status information from said record control means and said second predetermined conditions include recording means failure status indications in said received status information.

3. A system as described in claim 2 wherein said recording means comprise tape recorders and said failure status indications include indications of out-of-tape, broken tape, or jammed tape conditions.

4. A system as described in claim 3 wherein said recording means comprise a first plurality of amplifier means for amplifying said received signals and a second plurality of amplifier means for amplifying said received signals and said recorder control means further comprises means for monitoring said recorded signals and means for selectively receiving said amplified received signals from either said first plurality of amplifier means or from said second plurality of amplifier means, and wherein further said recorder control means responds to detection of failure of said recorded signals by said monitoring means to switch from said first plurality of amplifier means to said second plurality of amplifier means.

5. A system as described in claim 4 wherein said pluralities of amplifier means each further comprise means for generating a guard tone and for combining said guard tone with each of said received signals and said monitoring means further comprising means for detecting the presence of said guard tone in said recorded signal and indicating failure of said recorded signal upon failure to detect said guard tone.

6. A system as described in claim 5 wherein said recorded signals include information in a first band of frequencies and said guard tone in a second band of frequencies.

7. A system as described in claim 6 wherein said first band is substantially within the audio frequency range and said second band is substantially outside the audio frequency range.

8. A system as described in claim 4 wherein said recorder control of said first recording means means continues to monitor said recorded signals after switching from said first plurality of amplifier means to said second plurality of amplifier means, and upon a second detection of failure of said recorded signals:
    (a) indicates said second failure to said system control means when sending status information, when said first recording means is not in said stand-alone mode; and
    (b) initiates operation of said second recording means when said first recording means is in said stand-alone mode.

9. A system as described in claim 4 wherein said first and second recording means are substantially identical and said first and second plurality of amplifying means each include a pair of switchable outputs responsive to signals from said recorder control means to connect and disconnect said amplifier received signals to said recording means; whereby said first plurality of amplifying means may function as primary amplifying means for said first recording means and back-up amplifying means for said second recording means, and said second plurality of amplifying means may function as primary amplifying means for said second recording means and back-up amplifying means for said first recording means.

10. A system as described in claim 2 wherein said recording means comprise a first plurality of amplifier means for amplifying said received signals and a second plurality of amplifier means for amplifying said received signals and said recorder control means further comprises means for monitoring said recorded signals and means for selectively receiving said amplified received signals from either said first plurality of amplifier means or from said second plurality of amplifier means, and wherein further said recorder control means responds to detection of failure of said recorded signals by said monitoring means to switch from said first plurality of amplifier means to said second plurality of amplifier means.

11. A system as described in claim 10 wherein said pluralities of amplifier means each further comprise means for generating a guard tone and for combining said guard tone with each of said received signals and said monitoring means further comprising means to detect the presence of said guard tone in said recorded signal and indicating failure of said recorded signal upon failure to detect said guard tone.

12. S system as described in claim 11 wherein said recorded signals include information in a first band of frequencies and said guard tone in a second band of frequencies.

13. A system as described in claim 12 wherein said first band is substantially within the audio frequency range and said second band is substantially outside the audio frequency range.

14. A system as described in claim 2 wherein said recorded control means continues to monitor said recorded signals after switching from said first plurality of amplifier means to said second plurality of amplifier means, and upon a second detection of failure of said recorded signals:
  (a) indicates said second failure to said system control means when sending status information, when not in said standalone mode; and
  (b) initiates operation of said second recording means when in said stand-alone mode.

15. A system as described in claim 2 wherein said first and second recording means are substantially identical and include first and second pluralities of amplifier means for amplifying said received signals, each a pair of switchable outputs responsive to signals from said recorder control means to connect and disconnect said amplified received signals to said recording means; whereby said first plurality of amplifier means may function as primary amplifier means for said first recording means and back-up amplifier means for said second recording means, and said second plurality of amplifier means may function as primary amplifier means for said second recording means and back-up amplifier means for said first recording means.

16. A system as described in claim 1 wherein said recording means comprise a first plurality of amplifier means for amplifying said received signals and a second plurality of amplifier means for amplifying said received signals and said recorder control means further comprises means for monitoring said recorded signals and means for selectively receiving said amplified received signals from either said first plurality of amplifier means or from said second plurality of amplifier means, and wherein further said recorder control means responds to detection of failure of said recorded signals by said monitoring means to switch from said first plurality of amplifier means to said second plurality of amplifier means.

17. A system as described in claim 16 wherein said pluralities of amplifier means each further comprise means for generating a guard tone and for combining said guard tone with each of said received signals and said monitoring means further comprising means to detect the presence of said guard tone in said recorded signal and indicating failure of said recorded signal upon failure to detect said guard tone.

18. A system as described in claim 17 wherein said recorded signals include information in a first band of frequencies and said guard tone in a second band of frequencies.

19. A system as described in claim 18 wherein said first band is substantially within the audio frequency range and said second band is substantially outside the audio frequency range.

20. A system as described in claim 1 wherein said recorder control means continues to monitor said recorded signals after switching from said first plurality of amplifier means to said second plurality of amplifier means, and upon a second detection of failure of said recorded signals:
  (a) indicates said second failure to said system control means when sending status information, when not in said stand-alone mode; and
  (b) initiates operation of said second recording means when in said stand-alone mode.

21. A system as described in claim 1 wherein said first and second recording means are substantially identical and include first and second pluralities of amplifier means for amplifying said received signal each of said amplifiers means including a pair of switchable outputs responsive to signals from said recorder control means to connect and disconnect said amplified received signals to said recording means; whereby said first plurality of amplifier means may function as primary amplifier means for said first recording means and back-up amplifier means for said first recording means.

22. A system for monitoring signals received on at least one channel, comprising:
  (a) primary recording means for recording signals received on said at least one channel;
  (b) back-up recording means for recording signals from said of said channels received on said at least one channel;
  (c) system control means for controlling the operation of said recording means in accordance with status information received from said recording means, and being further for:
    (c1) requesting and receiving status information from said primary and back-up recording means;
    (c2) transferring recording to said signals from said primary recording of said signals from said primary recording means to said back-up recording means upon detection of a failure in said primary recording means or upon occurrence of a preselected event; and,
  (d) said primary recording means further comprising recorder control means for:
    (d1) monitoring the status of said primary recording means and sending said status information to said system control means in response to said requests;
    (d2) detecting failure to receive said requests for status information and thereupon entering a stand-alone mode;
    (d3) transferring recording of said signals to said back-up recording means upon detection of a failure of said primary recording means while in said stand-alone mode.

23. A system as described in claim 22 wherein in said back-up recording means is selected by establishing a hardwired connection between said primary recording means and a second recording means in said system, and connecting said second recording means to receive signals form said channels, said primary recording means transferring recording of said signals to said second recording means, so selected as said back-up recording means, by transmitting a signal through said hard-wired connection.

24. A system as described in claim 23 wherein said system control means stores information identifying said second recording means so selected as said back-up recording means.

25. A system as described in claim 22 wherein said recording means comprise tape recorders and failure of said primary recording comprises the occurrence of at least one condition selected from the following group of conditions: an out-of-tape condition, a broken tape condition, a jammed tape condition, and failure of the record amplifier means.

26. A system as described in claim 22 further comprising means for combining a guard tone signal with said received signals and failure of said primary recording means includes failure to detect said guard tone signal in said recorded signals.

27. A system as described in claim 22 further comprising means for combining a guard a tone signal with said received signals and wherein said combined received signals are selectively amplified for recording by either a primary plurality of amplifier means for amplifying said combined signals or a back-up plurality of amplifier means for amplifying said combined signals and wherein said recorder control means switches from said primary amplifier means to said secondary amplifier means upon a first failure to detect said guard tone in said recorded signals, and failure of said primary recording means includes a second failure to detect said guard tone in said recorded signals after switching to said back-up amplifier means.

* * * * *